Aug. 5, 1952 E. H. ROLF 2,605,574
ARTIFICIAL FISH LURE
Filed Sept. 15, 1949
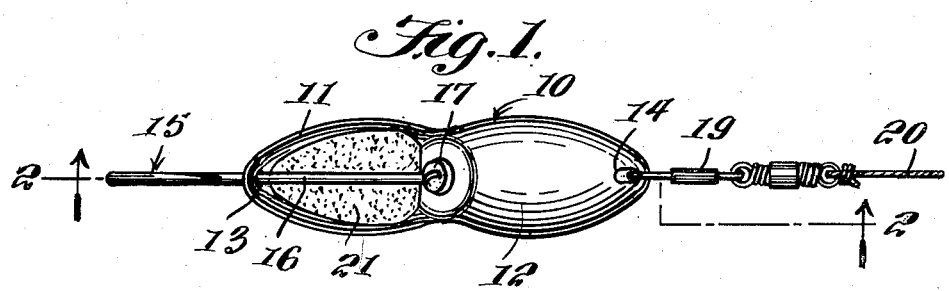
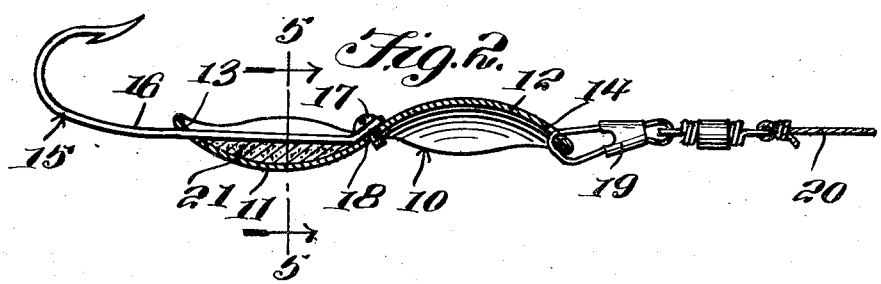
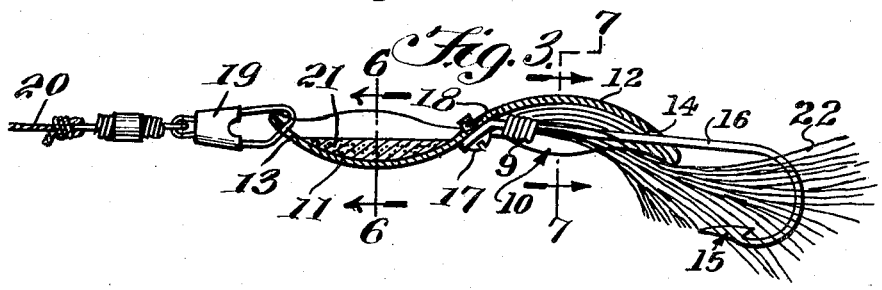
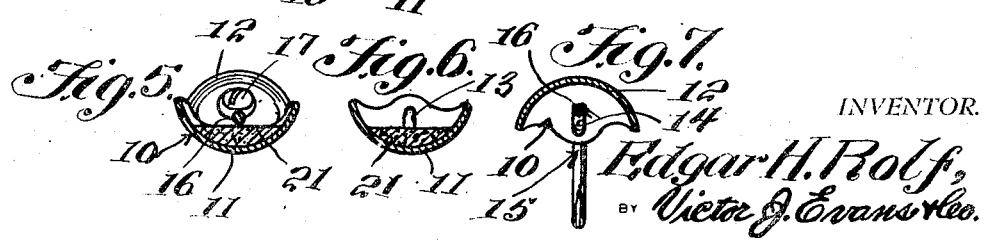
INVENTOR.
Edgar H. Rolf,
BY Victor J. Evans & Co.
ATTORNEYS Patented Aug. 5, 1952

2,605,574

UNITED STATES PATENT OFFICE 2,605,574

ARTIFICIAL FISH LURE

Edgar H. Rolf, Cheviot, Ohio

Application September 15, 1949, Serial No. 115,896

2 Claims. (Cl. 43—42.52)

This invention relates to fishing tackle, and more particularly to a fish lure.

The object of the invention is to provide a fish lure or spoon which has a very attractive movement when drawn through the water.

Another object of the invention is to provide a fish lure which is constructed so that as it is trolled through the water, the lure presents the appearance of a rapidly-moving fish, such as minnow.

A further object of the invention is to provide a fish lure which is extremely simple and inexpensive to manufacture.

Other objects and advantages will be apparent during the course of the following description.

In the accompanying drawings forming a part of this application, and in which like numerals are used to designate like parts throughout the same:

Figure 1 is a top plan view of the fish lure according to the present invention;

Figure 2 is a sectional view taken on the line 2—2 of Figure 1;

Figure 3 is a view showing a modified use of the lure;

Figure 4 is a side elevational view showing the fish lure in use, as shown in Figures 1 and 2;

Figure 5 is a sectional view taken on the line 5—5 of Figure 2;

Figure 6 is a sectional view taken on the line 6—6 of Figure 3;

Figure 7 is a sectional view taken on the line 7—7 of Figure 3.

Referring in detail to Figures 1, 2 and 4 of the drawings, there is shown a fish lure which includes a body member 10 that is in the form of an ogee, the body member 10 including a pair of oppositely-dished portions or spoon-like sections 11 and 12. The body member 10 is provided with an opening 13 adjacent one end, there being a similar opening 14 arranged in the other end of the body member. A fish hook 15 has its shank 16 passing through the opening 13, and a screw 17 serves to secure the end of the fish hook 15 to the body member 10. The screw 17 is arranged in threaded engagement with a threaded aperture 18.

Arranged in engagement with the other opening 14 is a snap-fastener 19, and connected to the snap-fastener 19 is a fishing line 20, whereby the fish lure can be trolled or pulled through the water. The dished-out portion 11 has a suitable weight 21 secured thereto, so that as the fishing lure is pulled through the water by the line 20, the weight 21 will tend to urge the dished portion 11 downwardly in the water.

Referring to Figures 3, 6 and 7, there is shown a modified use for the fish lure. Thus, in Figure 3, the snap-fastener 19 is arranged in engagement with the opening 13 instead of in engagement with the opening 14. Then, the fish hook 15 has its shank 16 passing through the other opening 14, and the screw 17 secures the fish hook 15 to the body member 10. Suitable camouflage, such as the feathers 22, Figure 3, may be used in order to disguise the fish hook 15. When the parts of the fish lure are arranged as shown in Figure 3, the weight 21 will normally urge the front portion of the fish lure downwardly into the water. Suitable cord 9, or other material, may be used for securing the feathers 22 in place.

From the foregoing, it is apparent that a fish lure has been provided which is extremely realistic and wherein the fish lure will simulate live bait, such as a minnow, when trolled or towed through water. The weight 21 provides the necessary gravitational force in order to cause either the forward or rear end of the body member 10 to be elevated in the water. The camouflaging feathers 22, Figure 3, may be used as desired. Further, the body member of the fish lure can be made in various sizes, depending upon the type of fishing being practiced. The snap-fastener 19 may be used or attached to the weighted end of the body member, as shown in Figure 3, or the snap-fastener 19 may be attached to the other end of the body member, as shown in Figure 2. The body member is preferably fabricated of a non-corrosive metal, such as stainless steel or Monel metal, and may be either stamped, cast, or forged. By using the fish lure of the present invention, the fisherman has complete control over the fish hook 15.

I claim:

1. A fish lure comprising an elongated sheet of material having an outwardly dished spoon-like section in one end portion and a similar outwardly dished spoon-like section in the opposite end portion wherein the spoon-like sections of the lure are in reverse relation to each other and each of said spoon-like sections extends from a point midway of the length of the spoon to an end thereof, the inner surfaces of said spoon-like sections substantially describing an S providing a connecting diagonally disposed section at the center of the lure, each of said spoon-like sections having openings in the outer ends thereof for receiving the shank of a hook and a fishing line, respectively, said lure having a threaded opening on the longitudinal center thereof and positioned in the said diagonally disposed section, and one of said spoon-like sections of the lure having a filling material therein providing a weight, a hook having a shank extended through the opening in one end of the lure, and a screw threaded in the opening in the diagonally disposed section of the lure at the inner end of the filling material for securing the hook in operative position on the lure.

2. A fish lure comprising an elongated sheet of material having an outwardly dished spoon-like section in one end portion and a similar outwardly dished spoon-like section in the opposite end portion wherein one spoon-like section of the lure are in reverse relation to each other and each of said spoon-like sections extends from a point midway of the length of the spoon to an end thereof, the inner surfaces of said spoon-like sections substantially describing an S providing a connecting diagonally disposed section at the center of the lure, each of said spoon-like sections having openings in the outer ends thereof for receiving the shank of a hook and a fishing line, respectively, said lure having a threaded opening on the longitudinal center thereof and positioned in the said diagonally disposed section, and one of said spoon-like sections of the lure having a filling material therein providing a weight, a hook having a shank with a diagonally disposed eye on the end thereof extended through the opening in one end of the lure, and a screw extended through the eye on the end of the shank of the hook and threaded in the opening in the diagonally disposed section of the lure at the inner end of the filling material for securing the hook in operative position on the lure whereby the hook can be mounted on the spoon with the shank thereof extended through the opening in the end containing the weight or through the opening in the end having a cavity in the spoon-like section.

EDGAR H. ROLF.

REFERENCES CITED

The following references are of record in the file of this patent:

UNITED STATES PATENTS

| Number | Name | Date |
|---|---|---|
| 356,499 | Pennell | Jan. 25, 1887 |
| 728,360 | Breidenstein | May 19, 1903 |
| 1,589,258 | Stanley | June 15, 1926 |
| 1,905,407 | Best | Apr. 25, 1933 |
| 2,278,842 | Fernstrom | Apr. 7, 1942 |